Oct. 29, 1940.    H. F. J. BAPTIST    2,219,407
ROTARY OVEN FOR THE HEAT TREATMENT OF COAL AND OTHER SOLID MATERIALS
Filed Dec. 8, 1936    2 Sheets-Sheet 1

Inventor:
Henri F. J. Baptist
by Richard E. Babcock
Attorney

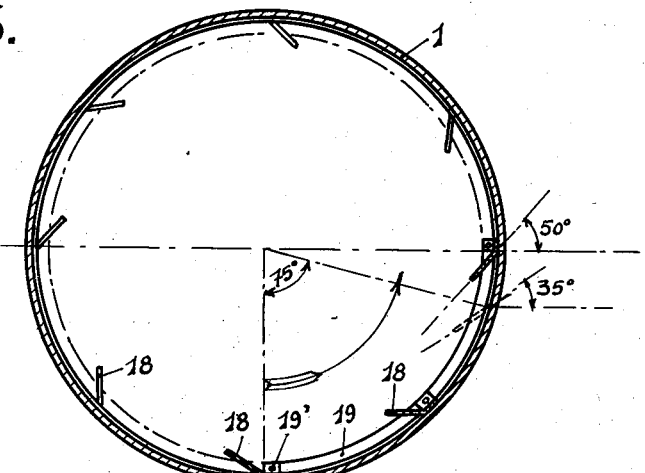
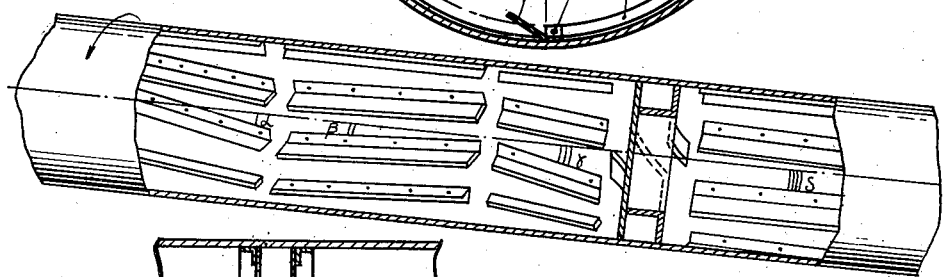
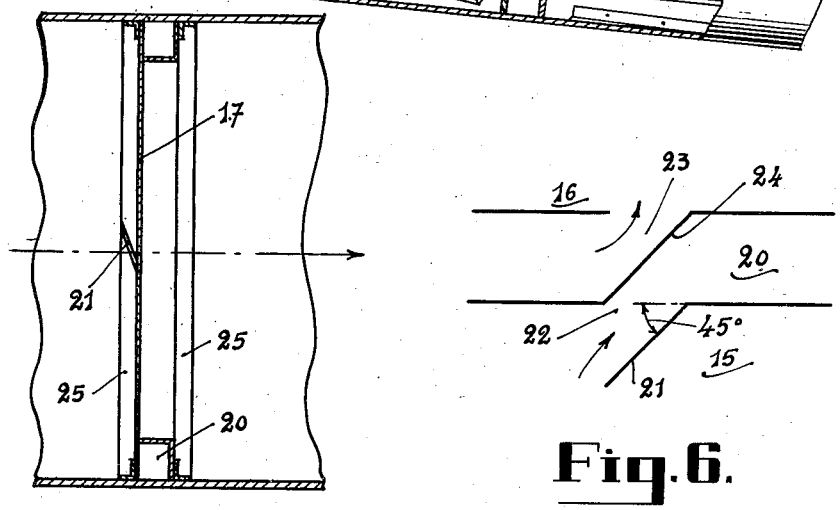

Patented Oct. 29, 1940

2,219,407

UNITED STATES PATENT OFFICE 2,219,407

ROTARY OVEN FOR THE HEAT TREATMENT OF COAL AND OTHER SOLID MATERIALS

Henri Felix Jean Baptist, Forest-Brussels, Belgium

Application December 8, 1936, Serial No. 114,812
In Belgium December 12, 1935

3 Claims. (Cl. 202—131)

The present invention has reference to rotary tubular ovens as used for the heat treatment of coal and other materials in a finely divided state, and more particularly to ovens for the purpose of bringing about the globular transformation of the coal consisting in heating the coal under continuous agitation up to a point, slightly below pasty fusion point, at which the softened grains assume a rounded form, which is all the more spherical as the grains are smaller, with a smooth and imperforated exterior surface, and acquire at the same time a cellular or reticular interior texture.

The object of the invention is to provide a process for enabling the globulation of coal to be efficiently produced on a commercial scale, together with an oven constructed for the purpose of carrying out the said process.

According to the invention a process for the heating of coal either alone or mixed with other substances, particularly for realising a globular transformation of the coal particles, is characterised by the fact that the material is rapidly heated, according to the nature of the coal, to the globulation temperature, this being determined by the globular looks of the coal and varying with the nature of the latter, with a constant or variable temperature increase, whereby the whole mass is uniformly heated right through, the greatest speed of heating being utilised in the globulation zone and the mass being continuously stirred during heating without encouraging the loss of vapours given off in the region of the globulation temperature, while avoiding local overheating and irregular or unequal heating of the grains of material in all their parts, and whilst preserving the atmosphere surrounding the material in the globulation zone.

The apparatus for carrying out the above process comprises a rotary tube oven, the rotary tube being surrounded by an outer heating chamber of a uniform narrow ring-like cross-sectional shape for the full length of the heating chamber, and the gases passing through the said heating chamber comprise a mixture composed of the gases from a combustion chamber and gases which are mixed afresh with the said combustion gases after giving up their heat in the heating chamber, so that the temperature of the charge is regulated by the quantity of the heating gases and the proportions in which the component parts are mixed together, means such as carriers or flanges being provided inside the rotary tube for the introduced material, the longitudinal and transverse inclinations of the carriers or flanges in different zones of the tube being disposed to suit the desired rate of progression of the material through the latter.

An oven of this construction ensures with the greatest efficiency the provision of the essential conditions for globulation, that is to say, a heating of the material in a progressive and perfectly uniform manner throughout the entire mass, with an easy and precise regulation of the final temperature reached, the evacuation of moisture and of the occluded gases which are evolved during the first part of the heating, and finally the maintenance of the most favourable atmosphere at the moment when globular transformation occurs and until the evacuation of the converted coal.

The regulation of the heat distribution along the tube (which can be obtained by varying the normally high speed of the heating gases by means of the variation in the total amount and in the proportion of the components of the heating gases) permits to follow the variations in the composition of the charge and of assuring a regulation of temperature in the charge of great sensibility and precision. The rotary tube of the oven may be divided by a partition or partitions into two or more compartments, the said partitions or partitions being so constructed that whilst they allow the material being treated to pass without hindrance, they serve to prevent the different atmospheres of each part of the oven from passing from one compartment to another. The rotatable tube may be disposed within a heating chamber arranged downstream of the combustion chamber and the admixing to the freshly burnt gases in the combustion chamber of a regulable portion of burnt gases which have already been passed along the tube in the heating chamber, improves the conditions of heat transmission. The high rate of heat transmission resulting from the normally high circulation velocity of the heating gases along the tube as well as the sectional narrowness of the space through which they pass (which makes that the gases run with turbulence and increases the heat transmission by radiation from the immovable wall of the heating chamber towards the tube's wall), permit to obtain a very rapid heating of the material passing through the oven and as the temperature of those heating gases is the highest in the globulation zone, this is where the most rapid heating will be obtained.

In order to render the nature of the present invention readily understandable, this will be hereinafter described in a more detailed manner with reference to the annexed drawings, which represent diagrammatically and by way of example an oven suitable for carrying out the process.

Figure 3 is a corresponding section showing how flanges inclined to the rear are working.

Figure 5 is a section through a diaphragm which divides the tube into compartments.

Figure 6 shows in greater detail the arrangement whereby the material passes through the diaphragm.

Figure 7 shows a detail view of a portion of the rotary tube, the wall of which is partly broken away, to show the disposition of the carriers or flanges.

Figure 1:
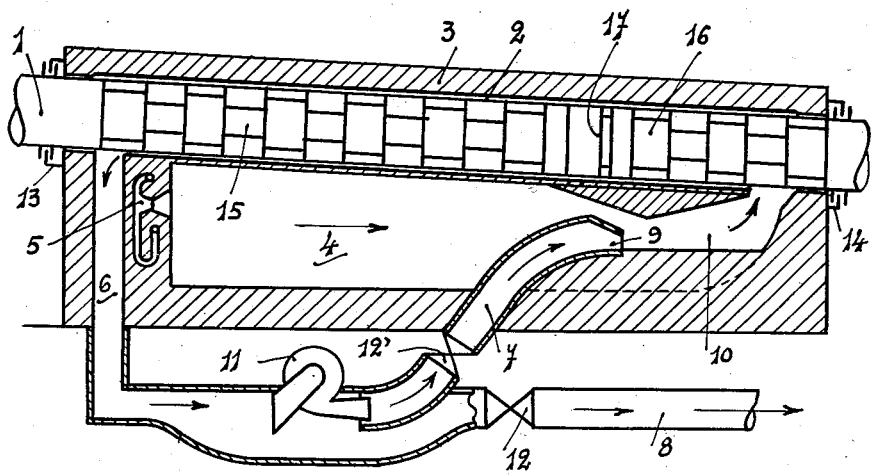
Figure 1 is a longitudinal section showing the whole of the oven.

Having reference to the figures, it is seen that the oven is constituted by a rotary tube 1 suitably dimensioned for the required output, the said tube being supported and brought into action in the usual and appropriate manner (not shown), and the greater portion of which rotates inside a heating chamber 2 formed inside the brickwork 3 which envelops the oven and at the same time contains the combustion chamber 4. The extremities of the tube 1 are closed in the known gas-tight manner (not shown). At the front end of the combustion chamber 4 can be seen the burner or burners 5, and it is easy to follow the course of the flames and of the hot gases, which, after having passed through the combustion chamber 4 to the rear extremity of the oven, return to the front by passing along the tube, and are evacuated by the flue 6.

The volume of the heating chamber 2 is reduced in such a manner as to bring about an increased speed in the circulation of the gases along the tube 1 such as is favorable to the transmission of heat. This speed of the gases can be still further increased by augmenting their volume through the re-introduction of part of the burnt gases into the combustion chamber at the down-stream side of the furnace or of the burners 5. For this purpose a by pass channel 7 is connected to the flue leading to the chimney 8. This channel terminates in a nozzle 9 and the mixture of the gases re-introduced with the combustion gases is facilitated by the convergent-divergent shape of the part 10 of the combustion chamber forming a restricted passage. Apart from the improvement in the conditions of heat transmission which is effected by this means, one has another important advantage in that the temperature of the gases is lowered by the mixture to a point which eliminates the possibility of local overheating and of the deterioration of the rotary tube in the hottest zone of the oven.

Moreover, the convergent-divergent shape given to the re-injecting part 10 of the combustion chamber may be used to bring about, in case of necessity, a lowering of pressure in the up-stream portion of the combustion chamber and consequently the draught or supplementary draught necessary for the functioning of the burners or of the furnace.

A re-injection ventilator or fan 11 and a regulating valve 12 and also a supplementary regulating valve 12¹, permit of the control and of the variation of the quantity of burnt gases thus re-introduced into the circuit. 13 and 14 are suitable joints to ensure the tight closure of the oven in relation to the outside atmosphere.

It will be noted further in Figure 1 that the tube is divided through its length into two compartments 15 and 16 by a partition or diaphragm 17. In the compartment 15 the material being heated, e. g., coal or mixture of coals to be globulated, is first dried, then loses its water of constitution and the occluded gases (such as $CO_2$ and noncondensable hydrocarbons). The steam and these gases are extracted by the usual appropriate means of evacuation (not represented) which may, for instance, be fitted in the inlet- and feed-head of the oven. In the compartment 16 the heating is continued up to the globulation temperature. Here tar vapours are evolved and also the first-distillation gases, and experience has shown that it is important from the standpoint of a good globulation that this atmosphere should not be diluted by air or steam or by the other gases (carbon dioxide and non-condensable hydro-carbons) which are evolved from the coal at low temperature, so that it is essential to have a gas-tight separation between the compartments 15 and 16.

For this purpose the diaphragm 17 is so constituted as to be hermetic, while permitting an easy progression of the material. With this end in view an advantageous arrangement consists in giving the peripheral part of the diaphragm the form of a helicoidal channel either single or multiple in which the coal accumulates and automatically forms a relatively tight joint. For instance as shown in Figure 5, a channel 20 of appropriate section runs along the periphery of the diaphragm 17. The products can penetrate into this channel under the action of a deflector 21 through an aperture 22 provided in the diaphragm, being finally evacuated into chamber 16 through another aperture 23 when they strike against the separating wall 24 (see Figure 6).

If it is intended to treat in the oven coals of different kinds, it is of advantage to secure the diaphragm 17 by means of pressure bolts (not shown) provided in the circles 25, which form part of the diaphragm, or by other suitable means which will permit of an alteration in the position of the diaphragm in the tube, with a view to varying the respective volumes of the compartments 15 and 16 and also the temperature at which the coal passes from the one compartment to the other.

With reference to the progression of the coal, experience has shown that in tubes with smooth interior walls a kind of balancing takes place with an irregular or jerky forward movement, in the course of which the mass of material is not agitated. This results in an irregular heating.

In the ovens in accordance with the present invention the interior walls of the tube are fitted throughout their entire length with a system of carriers in the form of ribs or flanges 18 which may, for instance, be constituted by angle irons supported in a suitable manner, such as by means of hoops 19 to which they can be detachably fixed by means of bolts 19¹.

The invention is notably characterised by the incline and particular positioning given to these flanges for the purpose of ensuring an agitation of the material by regular tilting without throwing or with limited throwing, and of controlling the progress through the furnace.

Figure 2:
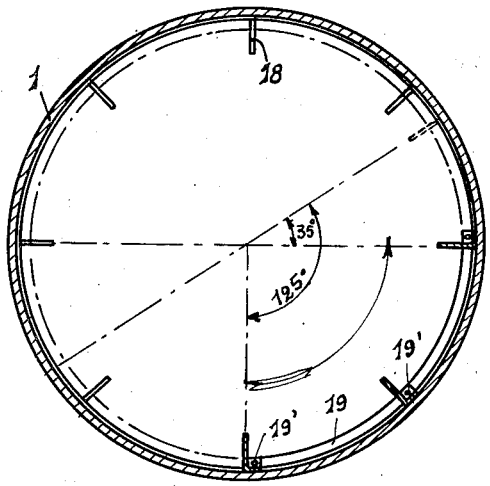
Figure 2 illustrates by cross-section through the tube the way in which the radial flanges are working.

Figure 2 shows that, when the flanges 18 are disposed radially, they are completely freed from the coal only after they have passed beyond the diametrically horizontal plane of the tube to a sufficient extent for their inclination to correspond to the angle at which the coal slides on the metal plate (this may be 35 degrees). The result of this is that a part of the carbon grains are in too prolonged contact with the metal plate and may become overheated, after which they fall freely from a fair height which causes or assists an excessive release of volatile matter, unless they stick to the metal plate and start the formation of agglomerates which harden rapidly and fall in the form of blocks into the mass.

Figure 4:
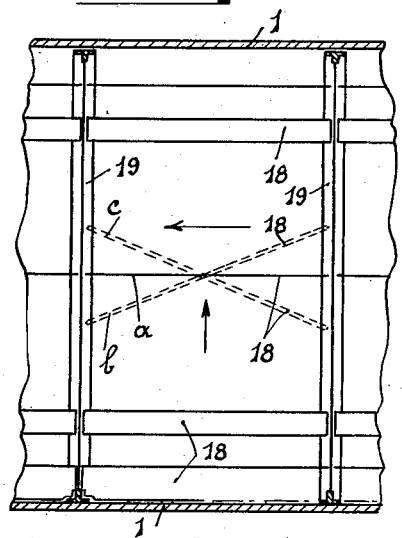
Figure 4 represents the longitudinal section of a length of tube and shows the method of fitting the flanges inside the said tube.

By inclining the flanges to the rear in relation to the direction of rotation of the tube, a better tilting of the mass of material is ensured, as well as a much more rapid release of the coal carried along by the flanges. In fact, as is shown in Figure 3, an inclination to the rear of, say 50 degrees, results in the angle at which the coal slides on the metal plate, let us say 35 degrees from the horizontal, is obtained when the flanges assume a position rather below the diametrically horizontal plane of the tube. This arrangement is particularly important in the compartment 16 in the zone where globular transformation takes place, as it prevents an excessive release of volatile matters and also the overheating of a part of the material which is likely to render the grains unsuitable for direct compression at a hot state. Moreover, the flanges may be parallel to the tube generatrices, or inclined to the rear or, again, inclined to the front in relation to the said generatrices. The flanges parallel to the generatrices (position a, Figure 4) may be considered as neutral, since they are only concerned with the agitation of the material without having any influence on the advance of the material. The flanges inclined to the front in relation to the generatrices (position b, Figure 4) propel the material at the same time as they agitate or tilt it, and consequently serve as progress accelerators. The flanges inclined to the rear in relation to the generatrices (position c, Figure 4) tend to check the progress of the material during the agitation or tilting, and are, therefore retarding agents.

By virtue of these properties it is possible, with an appropriate arrangement of a system of flanges, to control the pace at which the material advances along the tube, and in a corresponding manner to vary the heating.

Thus the longitudinal inclination of the flanges and also their inclination in relation to the direction of rotation of the tube I may be varied at different places in the oven, and may consequently be varied over the length of the same compartment. This enables a variation to be made in the speed of passage of the coal through different sections of the oven, and as a result—provided that the output remains constant—also a variation in the thickness of the layer of coal.

In the case of treating very bituminous coal it is possible to stimulate, after globulation, the release of a considerable portion of volatile matters in excess, by arranging the flanges 18 at the down-stream end of the oven in such a manner as to intensify the tilting of the material. This purpose can be attained, (1) by arranging the flanges, as regards their radial inclination, in such a manner as to give them a slight inclination to the rear (with respect to the direction of rotation of the oven), or as to set them perpendicularly with respect to the corresponding tangents to the oven wall, or even so as to give them a slight forward inclination (with respect to the direction of rotation of the oven); (2) by arranging the flanges, as regards their longitudinal inclination, so as to render them either neutral with respect to the advance of the material in the oven, or so that they serve more or less to retard the advance of the material.

As can be easily understood from the description given above, the characteristic arrangements hereinbefore stated, while being of extreme simplicity, permit of heating conditions most appropriate to the desired heat-treatment, combining extreme facility with great precision in regulation. The heat transmitted is uniformly distributed over the whole mass of material being treated, which is constantly maintained in the most suitable atmosphere and notwithstanding its intense agitation, it is only subjected to a minimum of disintegration and dust formation.

It should further be pointed out that the oven forming the subject of the present invention may be applied to the manufacture of coke or powdery semi-coke and to this manufacture in connection or combination with the globular process. In fact, in order to limit the inflating or foliating tendency of compressed agglomerates, it is often necessary to incorporate into them a porous substance capable of absorbing the gases released by the globular coal while it is hot. This substance may be quite simply non-bituminous and non-globular coal, but it could be with great advantage finely divided coke or semi-coke, and the furnace described can supply such a product simply by passing beyond the phase of globulation until an extensive degasification of the globular coal takes place, without, however, permitting it to form into an agglomerated mass. To intensify this degasification there may be fitted in the last length of the furnace radial flanges, or flanges even inclined forwardly with respect to the direction of rotation of the oven, which cause the grains to fall from a fair height.

The object of the present invention likewise consists in the application of the furnaces described hereinbefore to globulation and/or to the manufacture of coke of semi-coke from coal or lignite.

Having now particularly described and ascertained the nature of my said invention, and in what manner the same is to be performed, I declare that what I claim is:

1. A rotary tube oven for the globular transformation of coal comprising a rotary tube into which the coal is placed for treatment; means for rotating said tube; and adjustable stirring members attached to the inner face of the tube and adjustably inclined with respect to the length and radii of said tube to during rotation of said tube continuously stir said coal and control the rate of progress thereof through said tube in accordance with the speed of rotation of said tube; in combination with means enclosing said tube to form a heating chamber of thin annular cross-section; a furnace having a combustion chamber disposed therein adjacent said heating chamber; said combustion chamber and said heating chamber being connected adjacent the point of discharge of said tube whereby heating gases from said combustion chamber will travel through said heating chamber in a direction opposite to the direction of travel of coal in said tube and the degree of heat applied to the coal will increase as the coal progresses; a by-pass channel leading from the downstream side to the upstream side of said heating chamber; and a valve disposed in said channel whereby a regulable portion of the burnt gases from said heating chamber may be recirculated therethrough.

2. A rotary tube oven for the globular transformation of coal comprising a rotary tube into which the coal is placed for treatment; means for rotating said tube; adjustable stirring members attached to the inner face of the tube and adjustably inclined with respect to the length and radii of said tube to during rotation of said tube continuously stir said coal and control the rate of progress thereof through the tube in accordance with the speed of rotation of said tube; and a transverse partition longitudinally adjustably mounted in said tube to divide the same into two compartments, said partition being formed with a helicoidal channel passing therethrough in such manner that the coal passing therethrough during rotation of the tube constantly completely fills said channel thereby preventing the passage of gas from one compartment to the other; in combination with means enclosing said tube to form a heating chamber of thin annular cross-section; a furnace having a combustion chamber disposed therein adjacent said heating chamber; said combustion chamber and said heating chamber being connected adjacent the point of discharge of said tube whereby heating gases from said combustion chamber will travel through said heating chamber in a direction opposite to the direction of travel of coal through said tube and the degree of heat applied to the coal will increase as the coal progresses; a by-pass channel leading from the downstream side to the upstream side of said heating chamber; and a valve disposed in said channel whereby a regulable portion of the burnt gases from said heating chamber may be recirculated therethrough.

3. A rotary tube oven for the globular transformation of coal comprising a rotary tube; means for rotating said tube; adjustable stirring members attached to the inner face of the tube and adjustably inclined with respect to the length and radii of said tube; and a transverse partition longitudinally adjustably mounted in said tube to divide the same into two compartments, said partition being formed with a helicoidal channel passing therethrough; in combination with means enclosing said tube to form a heating chamber of thin annular cross-section; a furnace having a combustion chamber disposed therein adjacent said heating chamber; said combustion chamber and said heating chamber being connected adjacent the point of discharge of said tube; a by-pass channel leading from the downstream side to the upstream side of said heating chamber; and regulating means disposed in said channel whereby a regulable portion of the burnt gases from said heating chamber may be recirculated therethrough.

HENRI FELIX JEAN BAPTIST.